(12) United States Patent
Snis

(10) Patent No.: US 9,073,265 B2
(45) Date of Patent: Jul. 7, 2015

(54) METHOD FOR PRODUCTION OF A THREE-DIMENSIONAL BODY

(75) Inventor: Anders Snis, Uddevalla (SE)

(73) Assignee: Arcam AB, Moelndal (SE)

( * ) Notice: Subject to any disclaimer, the term of this patent is extended or adjusted under 35 U.S.C. 154(b) by 189 days.

(21) Appl. No.: 13/881,597

(22) PCT Filed: Jan. 28, 2011

(86) PCT No.: PCT/SE2011/050093
§ 371 (c)(1),
(2), (4) Date: May 8, 2013

(87) PCT Pub. No.: WO2012/102655
PCT Pub. Date: Aug. 2, 2012

(65) Prior Publication Data
US 2013/0300035 A1 Nov. 14, 2013

(51) Int. Cl.
*B29C 41/02* (2006.01)
*B29C 67/00* (2006.01)
(Continued)

(52) U.S. Cl.
CPC ........... *B29C 67/0077* (2013.01); *B29C 41/003* (2013.01); *B29K 2105/251* (2013.01);
(Continued)

(58) Field of Classification Search
CPC ...... B29C 41/003; B29C 41/02; B29C 41/52; B29C 67/0077; B29K 2105/251; G05D 23/00; G06F 19/00
USPC .................. 264/40.1, 497; 700/207, 212, 300
See application file for complete search history.

(56) References Cited

U.S. PATENT DOCUMENTS

| 4,401,719 | A | 8/1983 | Kobayashi et al. |
| 4,818,562 | A | 4/1989 | Arcella et al. |

(Continued)

FOREIGN PATENT DOCUMENTS

| DE | 19952998 A1 | 5/2001 |
| DE | 20305843 U1 | 7/2003 |

(Continued)

OTHER PUBLICATIONS

United States Patent and Trademark Office, Office Action for U.S. Appl. No. 12/810,602, Sep. 11, 2014, 7 pages, USA.

(Continued)

*Primary Examiner* — Leo B Tentoni
(74) *Attorney, Agent, or Firm* — Alston & Bird LLP

(57) ABSTRACT

The invention concerns a method for production of a three-dimensional body by successively providing powder layers and fusing together of selected areas of said layers, which areas correspond to successive cross sections of the three-dimensional body, wherein the method comprises the following steps for at least one of said layers: applying the at least one powder layer onto a working area, and fusing together a selected area of the at least one powder layer by supplying energy from a radiation gun to the selected area. The invention is characterized in that it comprises the steps of: establishing an intended beam path that is to be used when fusing together the selected area of the at least one powder layer, calculating a temperature in the at least one powder layer along the intended beam path as a function of a specific energy deposition of an imaginary beam that is assumed to move along the intended beam path, adjusting the specific energy deposition of the imaginary beam along the intended beam path depending on the calculated temperature and on conditions set for the step of fusing together the selected area, and providing, based on the calculations and the adjustments, an operating scheme for the specific energy deposition of the real beam to be used for the intended beam path when fusing together the selected area of the at least one layer.

10 Claims, 8 Drawing Sheets

(51) Int. Cl.
  *B29C 41/00* (2006.01)
  *G05D 23/00* (2006.01)
  *G06F 19/00* (2011.01)
  *B29C 41/52* (2006.01)
  *B22F 3/105* (2006.01)
  *B29K 105/00* (2006.01)

(52) U.S. Cl.
  CPC ............... *G05D23/00* (2013.01); *G06F 19/00* (2013.01); *B29C 41/52* (2013.01); *B22F 3/1055* (2013.01); *B29C 67/0088* (2013.01)

(56) References Cited

U.S. PATENT DOCUMENTS

| | | |
|---|---|---|
| 4,863,538 A | 9/1989 | Deckard |
| 4,927,992 A | 5/1990 | Whitlow et al. |
| 5,182,170 A | 1/1993 | Marcus et al. |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,419,203 B1 | 7/2002 | Dang |
| 6,554,600 B1 | 4/2003 | Hofmann et al. |
| 6,583,379 B1 | 6/2003 | Meiners et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,165,498 B2 | 1/2007 | Mackrill et al. |
| 7,204,684 B2 | 4/2007 | Ederer et al. |
| 7,540,738 B2 | 6/2009 | Larsson et al. |
| 7,686,605 B2 | 3/2010 | Perret et al. |
| 7,713,454 B2 | 5/2010 | Larsson |
| 7,799,253 B2 | 9/2010 | Höchsmann et al. |
| 7,871,551 B2 | 1/2011 | Wallgren et al. |
| 8,083,513 B2 | 12/2011 | Montero-Escuder et al. |
| 2002/0104973 A1 | 8/2002 | Kerekes |
| 2003/0133822 A1 | 7/2003 | Harryson |
| 2004/0084814 A1 | 5/2004 | Boyd et al. |
| 2004/0104499 A1 | 6/2004 | Keller |
| 2004/0173946 A1 | 9/2004 | Pfeifer et al. |
| 2005/0186538 A1 | 8/2005 | Uckelmann |
| 2006/0108712 A1 | 5/2006 | Mattes |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2007/0175875 A1 | 8/2007 | Uckelmann et al. |
| 2007/0182289 A1 | 8/2007 | Kigawa et al. |
| 2007/0196561 A1* | 8/2007 | Philippi et al. ................ 427/8 |
| 2007/0298182 A1 | 12/2007 | Perret et al. |
| 2008/0262659 A1* | 10/2008 | Huskamp .................. 700/300 |
| 2009/0017219 A1 | 1/2009 | Paasche et al. |
| 2009/0152771 A1 | 6/2009 | Philippi et al. |
| 2011/0133367 A1 | 6/2011 | Weidinger et al. |
| 2011/0316178 A1 | 12/2011 | Uckelmann |
| 2014/0367367 A1 | 12/2014 | Wood et al. |

FOREIGN PATENT DOCUMENTS

| | | |
|---|---|---|
| DE | 202008005417 U1 | 8/2008 |
| DE | 102008012064 A1 | 9/2009 |
| EP | 0289116 A1 | 11/1988 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 A1 | 5/1993 |
| WO | WO 01/81031 A1 | 11/2001 |
| WO | WO 01/85386 A2 | 11/2001 |
| WO | WO 02/08653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

United States Patent and Trademark Office, Office Action for U.S. Appl. No. 14/350,767, Nov. 24, 2014, 16 pages, USA.

International Searching Authority, International Search Report for International Application No. PCT/EP2012/058733, Mar. 5, 2013, 4 pages, European Patent Office, The Netherlands.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

International Preliminary Examining Authority (IPEA), Second Written Opinion for International Application No. PCT/EP2012/076025, mailed Dec. 4, 2013, 4 pages European Patent Office, Germany.

International Preliminary Examining Authority, International Preliminary Report on Patentability for International Application No. PCT/EP2012/076025, including Applicant's Sep. 10, 2013 Response to the ISA's May 17, 2013 Written Opinion and Applicant's Jan. 14, 2014 Response to the IPEA's Second Written Opinion, mailed Apr. 4, 2014, 15 pages, European Patent Office, Germany.

International Preliminary Examining Authority, International Preliminary Report on Patentability for International Application No. PCT/EP2012/074383, including Applicant's Sep. 6, 2013 Reply to ISA's Feb. 27, 2013 Written Opinion, mailed Jan. 20, 2014, 16 pages, European Patent Office, The Netherlands.

International Searching Authority (ISA), International Search Report and Written Opinion for International Application No. PCT/EP2012/076025, mailed May 17, 2013, 11 pages, European Patent Office, The Netherlands.

International Searching Authority, International Search Report and Written Opinion for International Application No. PCT/EP2012/074383, mailed Feb. 27, 2013, 10 pages, European Patent Office, The Netherlands.

Weigel, TH., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

(56) References Cited

OTHER PUBLICATIONS

International Searching Authority, International Search Report for International Application No. PCT/SE2011/050093, mailed Oct. 20, 2011, 5 pages, The Swedish Patent and Registration Office, Sweden.
European Search Report dated Feb. 16, 2012, for corresponding Application No. EP07852089.7.
International Preliminary Report on Patentability, dated Nov. 27, 2009, of corresponding international application No. PCT/SE2007/001084.
International Search Report dated Apr. 9, 2010 for Application No. PCT/SE2009/050901.
International Search Report dated Sep. 17, 2008 for Application No. PCT/SE2008/000007.
International Search Report mailed Sep. 2, 2008 of corresponding international application No. PCT/SE2007/001084.
Office Action dated Feb. 14, 2012 for U.S. Appl. No. 12/745,081.
Office Action dated Nov. 8, 2011, U.S. Appl. No. 12/745,081.
United States Patent and Trademark Office, Final Office Action for U.S. Appl. No. 12/745,081, dated Jun. 21, 2012, 6 pages, USA.
United States Patent and Trademark Office, Notice of Allowance and Fee(s) Due for U.S. Appl. No. 13/144,451, mailed Sep. 25, 2012, 16 pages, USA.
United States Patent and Trademark Office, Office Action for U.S. Appl. No. 12/810,602, mailed Sep. 10, 2012, 13 pages, USA.
United States Patent and Trademark Office, Office Action for U.S. Appl. No. 12/810,602, Dec. 20, 2012, 8 pages, USA.

* cited by examiner

METHOD FOR PRODUCTION OF A THREE-DIMENSIONAL BODY

CROSS REFERENCE TO RELATED APPLICATIONS

This application is a national stage application, filed under 35 U.S.C. §371, of International Application No. PCT/SE2011/050093, filed Jan. 28, 2011, the content of which is hereby incorporated by reference in its entirety.

BACKGROUND

1. Related Field

This invention relates to a method for production of a three-dimensional body by successively providing powder layers and fusing together of selected areas of said layers, which areas correspond to successive cross sections of the three-dimensional body.

2. Description of Related Art

Equipment for producing a three-dimensional object layer by layer using a powdery material which can be fused together and solidified by irradiating it with a high-energy beam of electromagnetic radiation or electrons are known from e.g. U.S. Pat. No. 4,863,538, U.S. Pat. No. 5,647,931 and SE524467. Such equipment include for instance a supply of powder, means for successively applying layers of powder on a vertically adjustable platform or working area, and means for directing the beam over the working area. The powder sinters or melts and solidifies as the beam, layer by layer, moves over the working area.

When melting or sintering a powder using a high-energy beam, it is important to have a thorough control of the temperature of the irradiated material to provide the object with appropriate material properties and to avoid geometrical deformations. For instance, a too high local temperature might destroy the object being produced and a too inhomogeneous temperature distribution might lead to cracks. Further, to provide for a thorough fusion the temperature of the upper layers of the powder bed should normally be kept above a minimum value during the melting step. Besides keeping control of the temperature it is normally important to try to reduce the production time, i.e. to try to sweep the beam as efficiently as possible over the selected area.

Only a selected part or area of each powder layer is fused together. The beam sweeps in a certain path over each selected area in a scan or hatch pattern that makes the area completely fused together. Often, this scan pattern has the form of parallel lines distributed at equal distances over the selected area. Each of these selected areas, which may include several part areas, corresponds to a cross section of the object being built up in the powder bed.

Sweeping the beam in a scan pattern with parallel lines can be done by scanning the lines in order. Due to heat transfer from heated material along previously scanned lines, the temperature in the material along a certain line to be scanned will be higher than the starting temperature (i.e. higher than the temperature in the material when the first line is scanned). At least when using a high-energy beam this temperature build-up must be taken into account in order to maintain an appropriate local temperature within the material.

One way of taking this into account is to adjust the beam energy input in response to the temperature build up. This could, for instance, be done by varying the beam power or by varying the speed at which the beam moves over the powder layer. An example is to increase the beam speed at beam turning positions where the end of a first scan line is close to the beginning of a second scan line. However, to do this properly it is needed to have information on the temperature in the material. This temperature, or more exactly the surface temperature of the powder bed, can be measured using a heat camera. Real-time corrections or controlling of the beam based on input from such a camera is, however, difficult to perform properly because of the long response time of the system (even if actions are taken to decrease the temperature immediately when an increased temperature has been detected the temperature is likely to continue increasing for some time). A heat camera may yet be useful for checking, after the production, whether anything went wrong in the production process.

U.S. Pat. No. 5,904,890 discloses a method where the beam scan speed is varied as a function of length of the scan lines in a scan pattern with parallel lines. The beam speed is lower for longer scan lines and higher for shorter lines as to avoid varying cooling when the beam is away from a certain area. The purpose is to achieve a homogeneous density distribution in the product produced. This method may be useful with regard to the above-mentioned temperature build-up if the beam speed is high compared with the length of the scan lines. However, if the scan lines are long the beam speed should be adjusted only at the end parts of the scan lines, and if the lines are distributed over several selected areas of the same powder layer or in a different pattern the temperature build up will not be similar at all parts of the area(s). Moreover, if the beam energy is high a more complex scan pattern may be required. In such cases the temperature build-up will not be properly taken into account just by varying the beam speed with respect to the length of the scan lines.

WO 2008/013483 discloses a method where parallel scan lines are scanned in a particular order so that a minimum security distance is established between consecutively scanned lines. Temperature (and charged particle) build-up between the scan lines is thus taken into account by preventing the occurrence of heat transfer interference between consecutively scanned lines. The method is primarily intended for pre-heating of the powder layer with a high beam speed and high beam power but could also be used for avoiding heat transfer interference during the step of melting the powder. However, this would lead to a rather time-consuming production process.

Thus, there is need for more elaborated scanning strategies which allows for a thorough temperature control as well as a time-efficient production.

BRIEF SUMMARY

An object of this invention is to provide a method of the above discussed type for production of a three-dimensional body, which method exhibits improved possibilities for controlling the temperature and speeding-up of the production. This object is achieved by the method defined by the technical features contained in the independent claims. The dependent claims contain advantageous embodiments, further developments and variants of the invention.

The invention concerns a method for production of a three-dimensional body by successively providing powder layers and fusing together of selected areas of said layers, which areas correspond to successive cross sections of the three-dimensional body, wherein the method comprises the following steps for at least one of said layers: applying the at least one powder layer onto a working area, and fusing together a selected area of the at least one powder layer by supplying energy from a radiation gun to the selected area.

The invention is characterized in that the method comprises the steps of: establishing an intended beam path that is to be used when fusing together the selected area of the at least one powder layer; calculating a temperature in the at least one powder layer along the intended beam path as a function of a specific energy deposition of an imaginary beam that is assumed to move along the intended beam path; adjusting the specific energy deposition of the imaginary beam along the intended beam path depending on the calculated temperature and on conditions set for the step of fusing together the selected area; and providing, based on the calculations and the adjustments, an operating scheme for the specific energy deposition of the real beam to be used for the intended beam path when fusing together the selected area of the at least one layer.

The term "intended beam path" relates to the scan or line pattern that is arranged across the selected area and refers to at least a part of the path the beam spot is intended to follow when the beam is swept over the selected area for the purpose of melting/fusing the powder within that area. In principle, the intended beam path can have any form as long as it provides for a thorough fusing of the powder within the selected area, i.e. it can for instance be segmented or continuous and include both straight and curved portions. Further, the beam path can vary even if the line pattern is the same, for instance if lines are scanned in a different order or if a single line is scanned in an opposite direction.

The step of "calculating the temperature in the at least one powder layer along the intended beam path as a function of a specific energy deposition of an imaginary beam that is assumed to move along the intended beam path" means that a local temperature or local temperature distribution in or close to the intended beam path along its extension is calculated, for instance by calculating the local temperature (distribution) in a number of points distributed along the intended beam path, taking into account the energy deposited to the material by an imaginary beam that is assumed to generate a specific energy deposition while moving along the intended beam path.

The local powder layer temperature in a certain point along the intended beam path (i.e. at a certain point of time) depends, for instance, on the starting temperature distribution in the material layer, the thermal properties of the material (such as thermal conductivity), the history of the specific energy deposition of the imaginary beam (including the current position of the beam and how much energy or power that has been deposited to the material layer during its path to the current position), and the geometrical pattern of the beam path.

The term "specific energy deposition of the beam" refers to the energy deposited by the (imaginary or real) beam per time unit and area unit of the layer (beam power and spot size), i.e. the power deposited per area unit, divided by the beam speed. Thus, varying the specific energy deposition can be done by varying the speed at which the beam moves over the layer surface, by varying the power of the beam and/or by varying the spot size of the beam (i.e. the layer surface area directly exposed to the beam at a certain point of time). In the calculations, the history of the specific energy deposition of the imaginary beam thus includes also variations in speed, power or spot size. Also the shape of the beam and the energy/power distribution in the beam may be varied and included in the calculations.

The calculations may be complicated and time-consuming and various simplifications can be made that allows a sufficiently accurate temperature to be calculated while still taking into account the history of the specific energy deposition (which may strongly affect the temperature in a point of the intended beam path where the beam not yet has reached but where heat has been conducted from previous, already "fused" parts of the intended beam path).

The step of "adjusting the specific energy deposition of the imaginary beam along the intended beam path depending on the calculated temperature and on conditions set for the step of fusing together the selected area" means that at least one of the beam parameters, i.e. the beam speed, power and/or spot size, is adjusted over a certain portion of the intended beam path if, for instance, the calculations indicate that the temperature becomes higher in a certain point than a condition set for the maximum temperature (which would call for e.g. an increase in beam speed or a reduction in beam power close to that particular point or for a change of the history of the specific energy deposition to reduce indirect, thermally conducted, heating of that point from previous parts of the beam path).

Adjustments of the specific energy deposition of the imaginary beam along the intended beam path may be handled such that re-calculations of the temperature along (parts of) the path are performed using other beam parameters. Alternatively, or as a complement, it is possible to make use of a set of predetermined data related to the material to be fused, wherein said data set comprises suitable values of the specific energy deposition as a function of the calculated temperature and the conditions set. Such predetermined data are useful for avoiding time-consuming re-calculations and can, for instance, be used when the temperature is calculated in a number of points distributed along the intended beam path. Depending on the temperature calculated in a "next" point positioned relatively closely ahead of a point corresponding to the current position of the imaginary beam, a suitable value of the specific energy deposition to be used when moving the beam from the current position until it reaches the "next" point can be directly obtained from the predetermined data. This procedure is repeated for the remaining points distributed along the intended beam path. Thus, in this way the specific energy deposition is stepwise adjusted along the intended beam path.

The term "operating scheme" (for the specific energy deposition) refers to how the specific energy deposition, i.e. how each of the speed, power and spot size, of the real beam is supposed to vary with time (or with position along the beam path since this position is related to time) during the step of fusing the powder. Thus, the operating scheme contains information on how the speed, power and spot size of the beam should vary when fusing the selected area. The step of providing or determining/establishing this operation scheme is a form of extraction and summary of the results from the previous steps. In the example above with stepwise adjustments of the specific energy deposition the operation scheme includes the stepwise variations of the beam parameters. The operation scheme can also include information on beam parameter settings for parts of the intended beam path where temperature calculations and specific energy deposition adjustments may not be required, such as for an initial part of the intended beam path.

The temperature in the material is related to its content of energy. It is therefore possible to, instead of calculating a true temperature, calculate and make use of another energy- and temperature-related parameter. The term calculated temperature covers also such related parameters.

The steps of establishing the intended beam path, calculating the temperature along the intended beam path, adjusting the imaginary specific energy deposition and determining the operating scheme do not necessarily have to be carried out one at a time or strictly in the order given. For instance, calculations and adjustments can be carried out in an iterative manner and the operating scheme can be determined step by step for fractions of the entire beam path. Further, although the step of establishing the intended beam path can be rather simple—a preset line pattern with equally spaced straight and parallel lines with a given scan direction can be chosen—this step may comprise calculations and adjustments for finding a favourable line pattern and a favourable, finally selected, intended beam path.

Accordingly, the invention refers in short to a method where the specific energy deposition of the beam to be used when fusing together the powder can be pre-adjusted to vary in response to the temperature build-up for the particular scan pattern to be used by calculating the resulting temperature along the beam path for different specific energy depositions and conditions. In other words, the inventive method makes it possible to predetermine, by calculation and adaptation, how the specific energy deposition of the beam should vary with time (or position on the selected area) when it passes along the path pattern and melts the powder.

Various conditions may be used in the calculations to optimize the operation scheme of the specific energy deposition such as to minimize production time, avoid exceeding a certain maximum temperature, avoid exceeding a certain temperature during a certain time interval, minimizing the highest temperature acquired, obtain an even width of melted material along the beam path, and various combinations of these, such as a compromise between minimizing production time and the highest temperature acquired. Various possible beam paths can be evaluated before selecting the intended one.

To simplify and speed up the calculations, the conditions can include preset (pre-calculated) values of one or two of the beam parameters (speed, power and spot size) and/or a preset beam path, such as a set of parallel lines placed at a similar distance from each other.

The inventive method is generic and is applicable to any geometry of the selected area. It should be noted that a powder layer may comprise several selected areas that may have similar or different geometries.

When a suitable specific energy deposition operation scheme has been determined, this scheme is used for the actual melting/fusing together of (the part of) the selected area of the layer in question. The inventive method is preferably used on all, or at least most of, the layers in the object formed.

An effect of the invention is that it provides for a thorough control of the temperature and the temperature distribution of the selected area and makes it possible to plan the fusion step in a sophisticated way. In turn, this can be used to avoid reaching too high temperatures (which may destroy the product being built), to obtain a homogeneous temperature distribution (which improves the product properties by reducing stress and crack formation) and to speed up the production (which makes the production more cost-effective).

In an advantageous embodiment of the invention the method comprises the step of using the operating scheme for the specific energy deposition when fusing together the selected area of the at least one powder layer.

In a further advantageous embodiment of the invention the specific energy deposition is the energy deposited by the beam per time unit and area unit divided by the beam speed, and that the specific energy deposition can be varied by varying a beam speed, a beam power and/or a beam spot size.

In a further advantageous embodiment of the invention the method comprises the use of a set of predetermined data related to the material to be fused, wherein said data set comprises values of the specific energy deposition to be selected as a function of temperature calculated and conditions set.

In a further advantageous embodiment of the invention the conditions set for the fusing step includes one or several of the following conditions for the at least one powder layer: maximum temperature; working temperature: melt depth and melt width.

In a further advantageous embodiment of the invention the step of calculating the temperature includes the step of solving a time dependent heat equation.

In a further advantageous embodiment of the invention the step of calculating the temperature includes calculating a local temperature distribution along the intended beam path.

In a further advantageous embodiment of the invention the step of calculating the temperature includes several calculations carried out in or close to a number of points distributed along the intended beam path.

In a variant of this embodiment, the maximum distance between adjacent points of calculation is set by setting a limiting value for the allowed change of the specific energy deposition between the adjacent points. For instance, if only the beam speed is varied a maximum allowed change for the beam speed is set.

In a further advantageous embodiment of the invention the step of establishing the intended beam path includes the steps of: making calculations of the temperature along a plurality of possible beam paths, and selecting the intended beam path out of said plurality of beam paths.

BRIEF DESCRIPTION OF THE FIGURES

In the description of the invention given below reference is made to the following figure, in which.

DETAILED DESCRIPTION OF VARIOUS EMBODIMENTS

Figure 1:
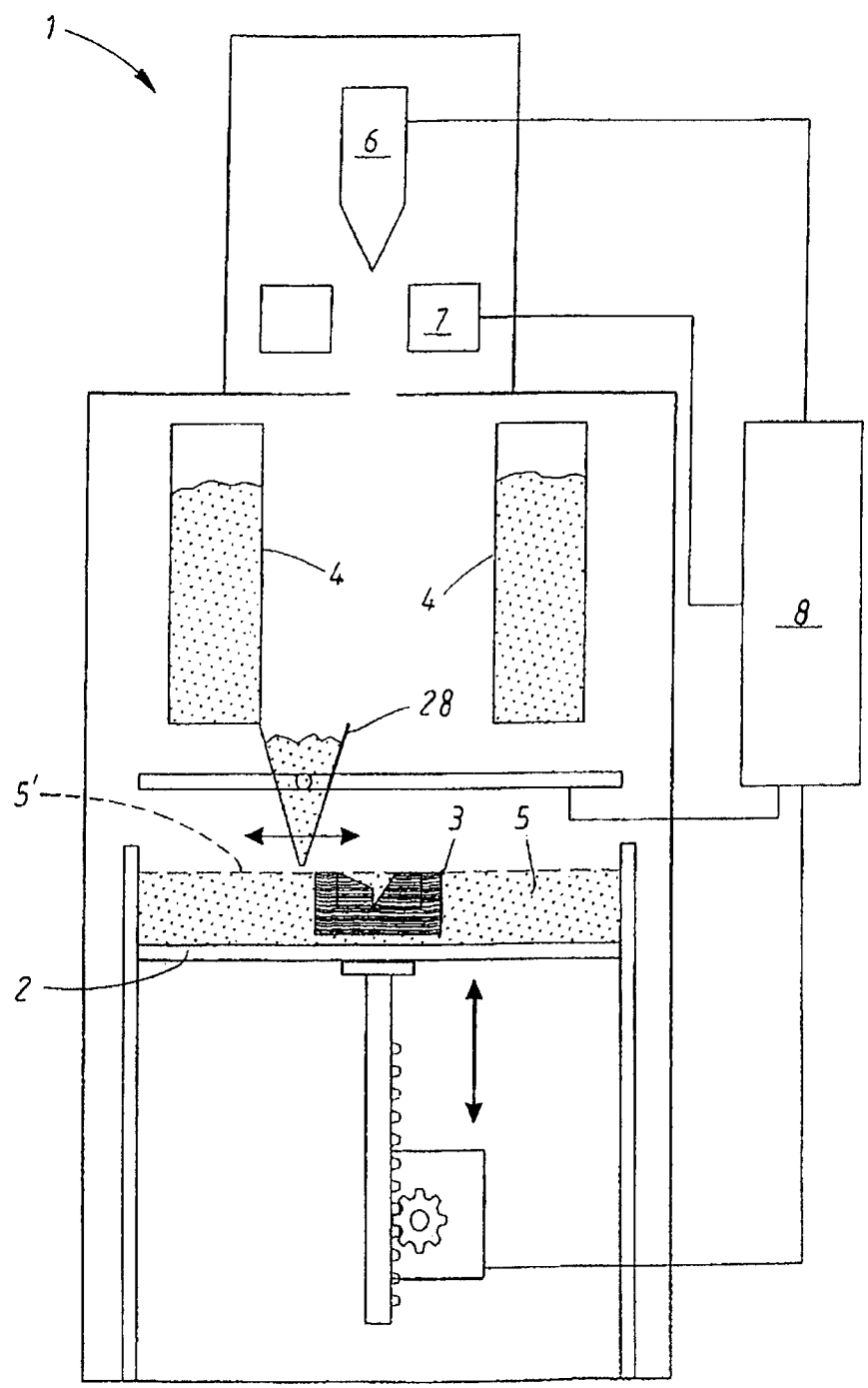
FIG. 1 shows, in a schematic view, an example of a known device for producing a three-dimensional product to which the inventive method can be applied.

FIG. 1 shows an example of a known device 1 for producing a three-dimensional product. The device 1 comprises a vertically adjustable work table 2 on which a three-dimensional product 3 is to be built up, one or more powder dispensers 4, means 28 arranged to successively distribute thin layer of powder on the work table 2 for forming a powder bed 5, a radiation gun 6 in the form of an electron gun for delivering energy to the powder bed 5 as to fuse together parts of the powder bed 5, deflection and beam shaping coils 7 for guiding and shaping the electron beam emitted by the radiation gun 6 over said work table 2, and a control unit 8 arranged to control the various parts of the device 1.

In a typical work cycle, the work table 2 is lowered, a new layer of powder is applied onto a working area on top of the powder bed 5, and the electron beam is scanned over selected parts of the upper layer 5' of the powder bed 5. In principal, this cycle is repeated until the product is finished. An expert in the field is familiar with the general function and composition of devices for producing a three-dimensional product, both with regard to the type outlined in FIG. 1 and to devices equipped with a laser gun instead of an electron gun.

Conventionally, apparatuses provided with an electron gun work with vacuum, normally below at least $10^{-2}$ mbar, to avoid that the electron beam interacts with atoms or molecules located between the electron gun and the working area.

Figure 7:
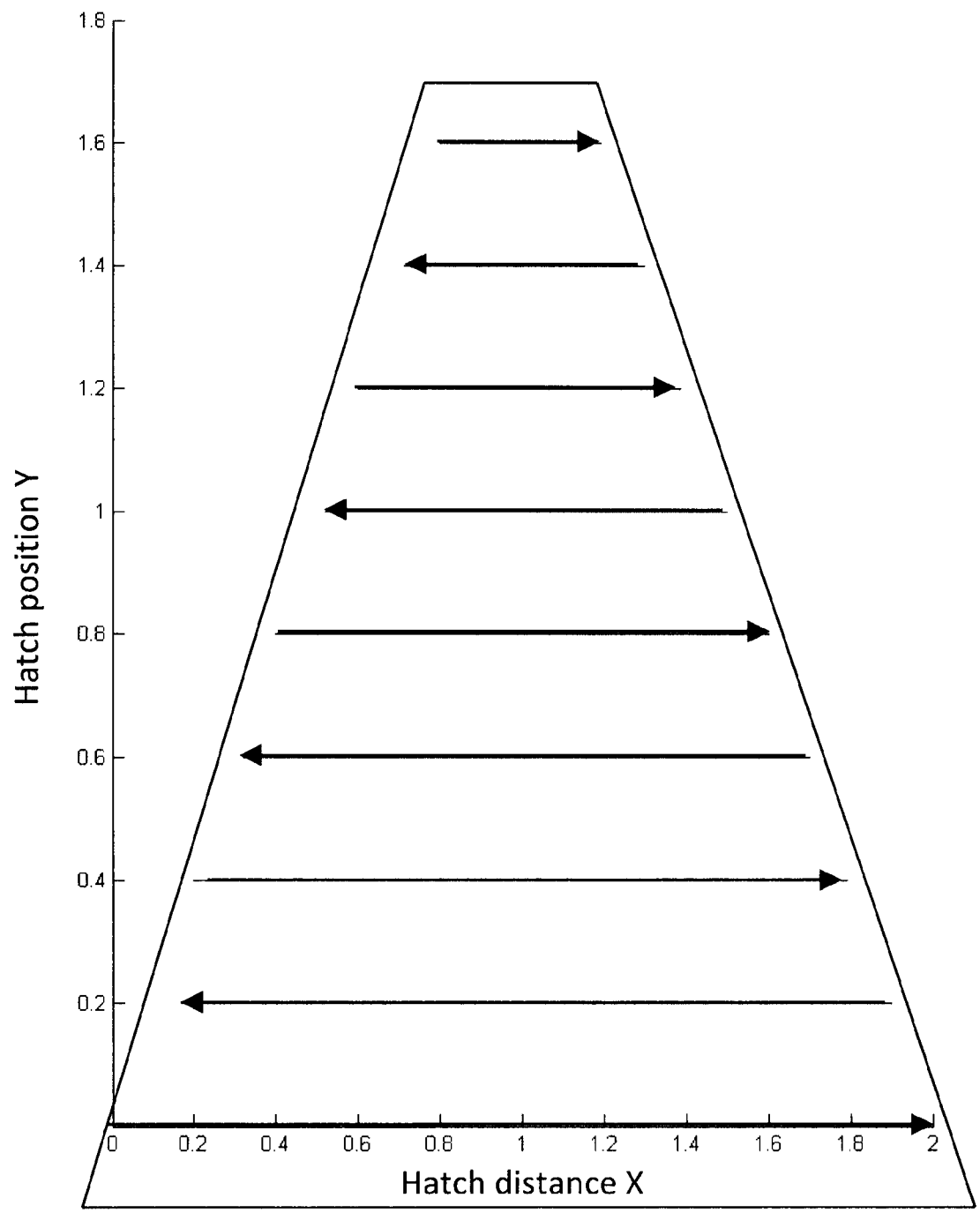
FIG. 7 shows an example of an intended beam path for a selected area having the form of an isosceles trapezoid, wherein the intended beam path is such that the beam starts to scan the lines from the bottom to the top while altering the direction from left to right to right to left.

An example of a powder layer selected area having the form of an isosceles trapezoid is shown in FIG. 7. The intended beam path is also shown.

An embodiment of the inventive method will now be described. In an example of this embodiment the intended beam path follows a plurality of parallel and straight lines (scan or hatch lines) distributed at an equal distance from each other. The beam parameter adjusted is in this example the beam speed. In the calculations, the beam speed is adjusted such that the width of the melted material at a specific depth (Cf. melt width and melt depth in FIG. 2) becomes equal along the entire beam path. This allows for the use of a fixed distance between the parallel parts of the beam path. Remaining parameters are predetermined (or calculated from other predetermined parameters).

As an overview, the embodiment of the method can be described as follows:
1. Data consisting of temperature profiles and related beam parameters (spot size and beam speed) for different sets of material properties, material temperatures and beam powers are created and stored in a data base. These data are obtained by FEM calculations on a simple geometry similar to the test box shown in FIG. 2.
2. The machine used for producing the three dimensional body calculates in real time the local temperature distribution for each of a number of points distributed along the beam trajectory (path) by solving a time dependent heat equation. The solution of the equation is obtained by expanding the temperature profiles of previously fused (i.e. imaginary fused) hatch lines with Gaussian envelopes. The temperature profiles corresponding to the used beam and material parameters are obtained from the data base
3. The beam parameters in a specific point are selected depending on the local calculated temperature distribution and they are obtained from the pre-calculated data in the data base (by comparing the calculated temperature distribution with the pre-calculated temperature profiles for the material used and selecting the beam parameters corresponding to the profile that best fits the calculated distribution).
4. Once a hatch line has been finished the temperature profile at the end of the line is also approximated by Gaussian functions and steps 2 and 3 (i.e. the two previous steps) are repeated for the next hatch line.

The expression that the calculations are carried out in real time means that fusing of the powder is carried out at the same time as the calculations. Typically, calculations of the beam parameter operating scheme for a subsequent layer is carried out while a previous layer is fused. In principle it is possible to carry out all calculations and determinations of the operation scheme for all layers before starting the fusion process of the first layer, but this would normally lead to a waiting time before starting the production. In the other extreme the calculations and determinations of the operation scheme is carried out for points along the beam path very close to where the real beam is positioned, but this would lead to a very small margin for making corrections or re-calculations if something goes wrong in the calculations or in the fusing.

Introduction to the Embodiment of the Method

To obtain the appropriate data needed for controlling the melt process according to the method described, consider the time dependent heat equation without heat source and over the homogeneous material domain $-\infty < x < \infty$, $-\infty < y < \infty$ and $-\infty < z < 0$:

$$\frac{\partial}{\partial t} T(x, y, z, t) - \frac{\lambda}{c_p \rho} \nabla^2 T(x, y, z, t) = 0. \qquad \text{Eq. 1a}$$

Here, $T(x,y,z,t)$ is the time dependent temperature distribution, $\lambda$ is the thermal conductivity, $c_p$ is the heat capacity and $\rho$ is the density of the material.

The boundary conditions are summarized as follows:

$$T = T_0; x, y \to \pm\infty, z \to -\infty \qquad \text{Eq. 1b}$$

A Gaussian shaped source term on $z=0$ moving in the x-direction is used for describing the imaginary energy beam. Radiation through the same top surface is assumed to follow the law of Stefan-Boltzmann $$-\lambda \frac{\partial}{\partial z} T(x, y, t)\bigg|_{z=0} = \qquad \text{Eq. 1c}$$
$$\frac{P_{in}}{2\pi\sigma^2} e^{(-((x-v_x t)^2 + y^2)/2\sigma^2)} - radcoeff (T(x, y, 0, t)^4 - T_{sur}^4)$$

Here, $P_{in}$ is the absorbed beam power, $v_x$ is the beam speed, $\sigma$ is the variance (beam spot size), radcoeff is the radiation coefficient from the surface and $T_{sur}$ is the surrounding temperature above the surface.

$T_0$ is the working temperature, i.e. the desired temperature of the material before melting/fusing.

To decrease the time it will take to generate the data it might be appropriate to remove the time dependency by assuming that the temperature distribution around the moving spot has reached steady state ($x=x-tv_x$, $dt=-dx/v_x$)

$$-v_x \frac{\partial}{\partial x} T(x, y, z) - \frac{\lambda}{c_p \rho} \nabla^2 T(x, y, z) = 0 \qquad \text{Eq. 2a}$$

$$-\lambda \frac{\partial}{\partial z} T(x, y, 0) = \qquad \text{Eq. 2b}$$
$$\frac{P_{in}}{2\pi\sigma^2} e^{(-(x^2+y^2)/2\sigma)} = radcoeff(T(x, y, 0)^4 - T_{sur}^4)$$

$$T(\pm\infty, \pm\infty, -\infty) = T_0 \qquad \text{Eq. 2c}$$

The above heat equations could be solved with for instance FEM techniques for several different sets of material properties, $T_0$ and beam settings.

Figure 2:
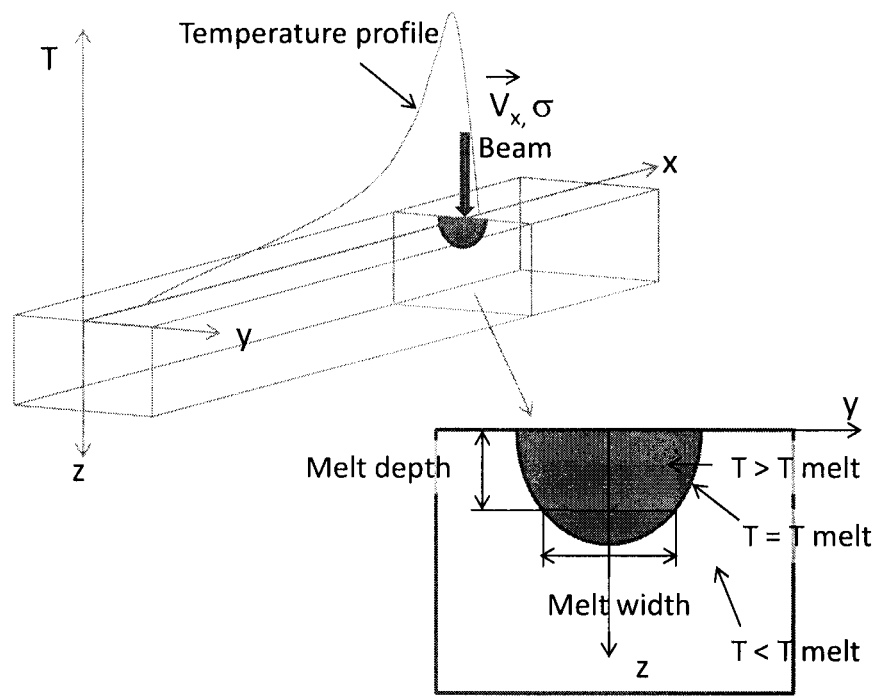
FIG. 2 shows a schematic view of the surface temperature profile and the corresponding melt depth and melt width in a box where the beam is travelling in the direction of the positive x-axes.

How this procedure may work is exemplified in FIG. 2.

FIG. 2 depictures a "test box" where the beam is travelling in the direction of the positive x-axes. The temperature profile at the surface is shown together with a slice in which the melt volume is represented by the isothermal curve corresponding to the melt temperature of the material. Here, the beam parameters, $v_x$ and $\sigma$, have been optimized to obtain a specific profile of the melt volume in terms of melt depth and melt width. Moreover the maximum temperature within the material has been limited to Tmax. Of course there could be other conditions used for optimizing the beam parameters. For instance minimizing temperature gradients in the melt volumes could be one such condition.

The temperature profiles needed for describing the energy input at the end of a hatch line will be obtained by approximating T(x,y,z) in eq. 2a with a series of Gaussian functions. By doing this it will later on be possible to obtain an analytical solution for the temperature distribution in the half infinity domain even for an arbitrary number of hatch lines. The series T'(x,y,z) will be:

$$T(x, y, z) \approx T'(x, y, z) = \qquad \text{Eq. 3}$$

$$T_0 + \sum_{i=1}^{i=N} A_i \exp(-(x - xpos_i)^2 / \sigma_{x_i}) \exp(-z^2 / \sigma_{z_i}) \exp(-y^2 / \sigma_{y_i}).$$

The parameters $A_i$, $xpos_i$, $\sigma_{x_i}$, $\sigma_{y_i}$, $\sigma_{z_i}$ and a can be obtained from a point wise non linear square fit between T(x,y,z) and T'(x,y,z). Here, $xpos_i$ is the x-position of the exponential term i along the beam path. In the beam coordinate system it will be a negative value since the beam is assumed to travel in the positive x-direction and located at x=0.

Figure 3:
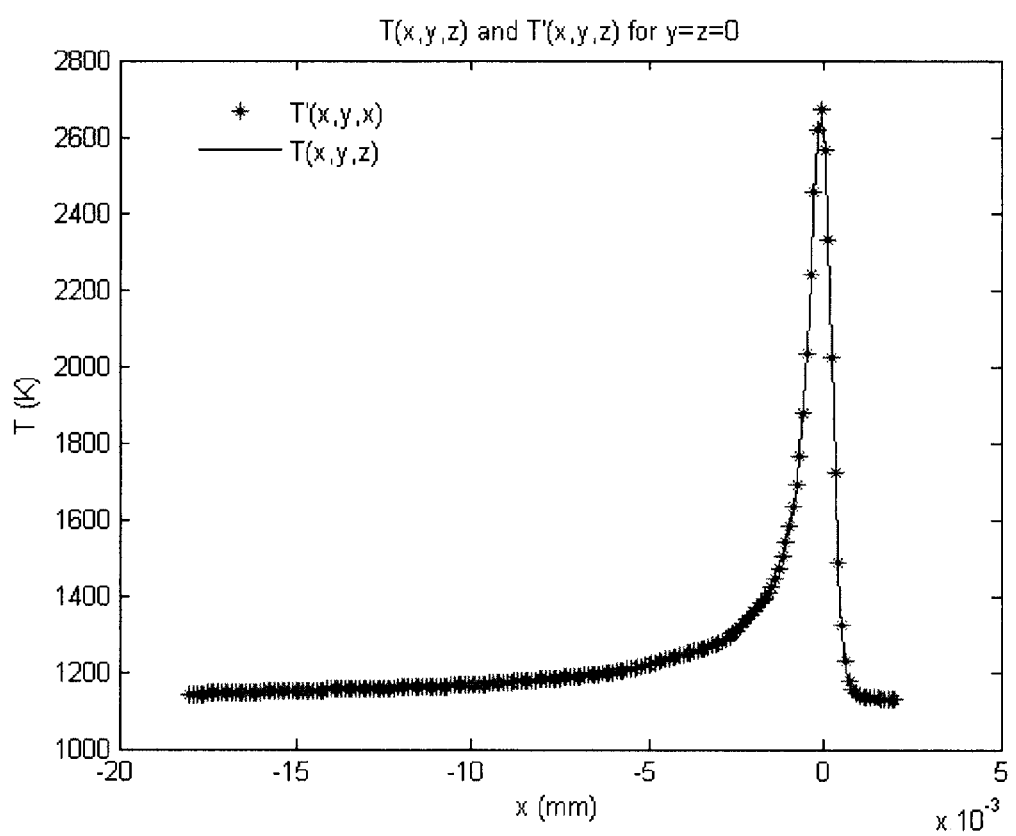
FIGS. 3-5 show some temperature distribution profiles, calculated by FEM, together with approximated distributions according to the Gaussian series in eq. 3.
Figure 4:
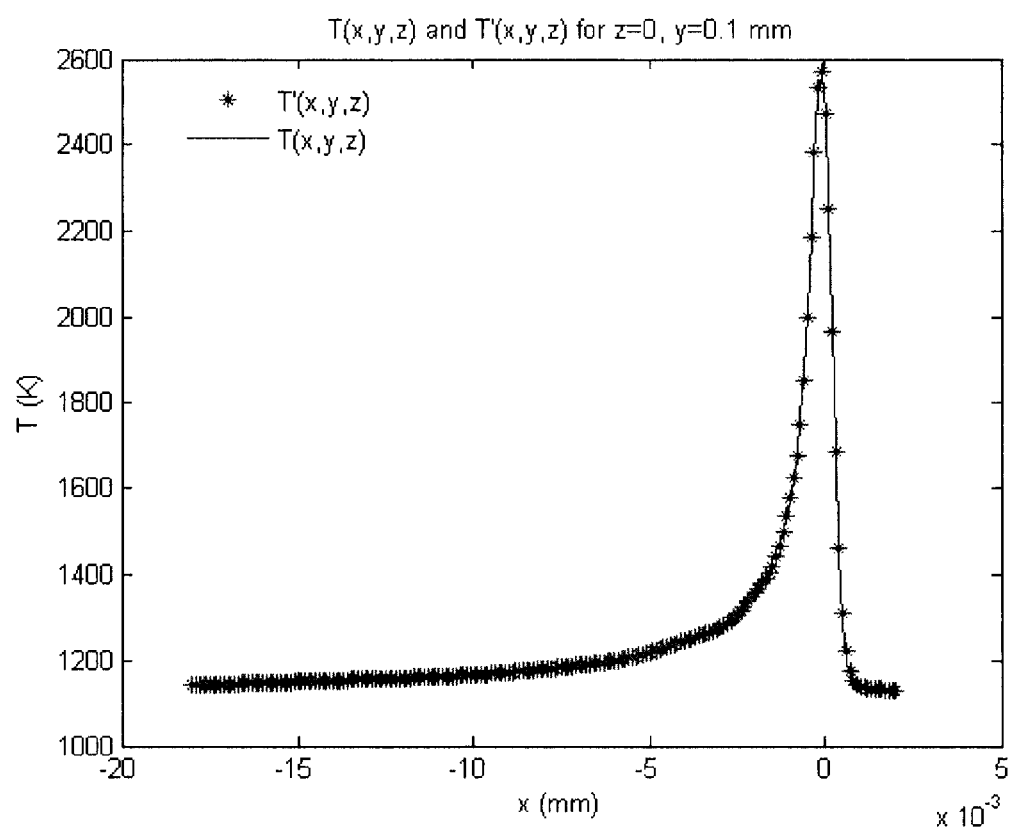
Figure 5:
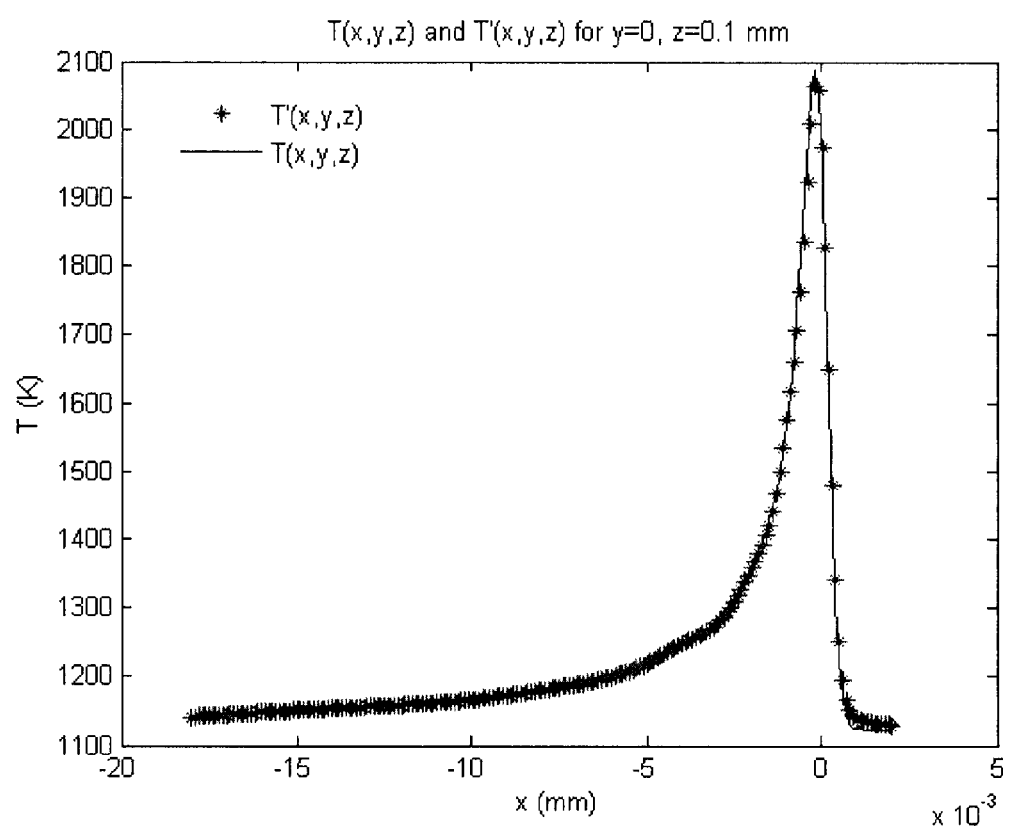

In FIGS. 3-5 some temperature distributions, calculated by FEM, are shown together with the approximated distribution according to eq. 3.

The goodness of the fit is mainly determined by the number of Gaussian functions used. In the example below N is equal to a value of 10 to 12 meaning that there are 30 to 36 Gaussian functions used for each temperature profile.

Time Dependent Temperature Distribution within the Material

The time dependent temperature distribution, T'(x,y,z,t), within the material after the beam has scanned one line is obtained by Green functions and convolution together with the initial conditions T'(x',y',z'), obtained from equation 3:

$$T'(x, y, z, t) = \qquad \text{Eq. 4}$$

$$\frac{1}{(4\pi Dt)^{3/2}} \int_{-\infty}^{\infty} \int_{-\infty}^{\infty} \int_{-\infty}^{0} \left( \exp\left(-\frac{(z-z')^2}{4Dt}\right) + \exp\left(-\frac{(z+z')^2}{4Dt}\right) \right)$$

$$\exp\left(-\frac{(y-y')^2}{4Dt}\right) \exp\left(-\frac{(x-x')^2}{4Dt}\right)$$

$$T'(x', y', z') dz' \, dy' \, dx' + T_{surf} - T_0$$

where $$D = \frac{\lambda}{c_p \rho}.$$

Here we have assumed that the material temperature is equal to $T_{surf}$ and different from $T_0$. The heat loss through the surface is now put to zero:

$$-\lambda \frac{\partial}{\partial z} T'(x, y, 0, t) = 0$$

When the beam has scanned M lines the right hand side of the equation 4 is replaced by a summation:

$$T''(x, y, z, t) = T_{surf} + \sum_{j=1}^{j=M} \frac{1}{(4\pi D(t-t_j))^{3/2}} \qquad \text{Eq. 5}$$

$$\int_{-\infty}^{\infty} \int_{-\infty}^{\infty} \int_{-\infty}^{0} \left( \exp\left(-\frac{(z-z')^2}{4D(t-t_j)}\right) + \exp\left(-\frac{(z+z')^2}{4D(t-t_j)}\right) \right)$$

$$\exp\left(-\frac{(y-y')^2}{4D(t-t_j)}\right) \exp\left(-\frac{(x-x')^2}{4D(t-t_j)}\right)$$

$$T'_j(x', y', z') H(t-t_j) dz' \, dy' \, dx' - T_{0j}.$$

where $t_j$ is equal to the time when line j was finished, $T_{0j}$ is the temperature around the spot when line j was finished, $T'_j(x', y', z')$ is the temperature distribution according to eq. 3 for line j and $H(t-t_j)$ is the heaviside step function defined as:

$$H(t) = \begin{cases} 0, & t < 0 \\ 1, & t \geq 0 \end{cases}$$

When inserting the expression for T'(x,y,z) (eq. 4.) into eq. 5 it has to be kept in mind that the x, $xpos_i$ and y coordinates in eq. 3 refer to a local coordinate system centred around the end point of line j with the x axes pointing in the direction of the beam movement for this line, whereas the x' and y' coordinates in eq. 5 refer to the global coordinate system determined by the surface of the part. Moreover if the beam path of line j has to be described by several line segments, each with a different direction, y in eq. 3 has to be replaced by $d_{y'_i}^{k_j}$, which is the distance between line segment k for line j and the point (x',y'), and x'-$xpos_i$ has to be replaced by $d_{x'_i}^{k_j}$, which is the distance between the position of the exponential x-term i on the line segment and the projection point of the (x',y') on the same line segment (see FIG. 6).

In this way any kind of beam paths can be considered. However, it should be remembered that the temperature distribution in eq. 3 is obtained from a straight line simulation. Thus, if the curvature of the beam path is very significant just placing the terms in eq. 3 along this path with the same distances as determined by the $xpos_i$ values, might be a rather poor approximation. In such case a FEM solution on a curved geometry may be needed.

Figure 6:
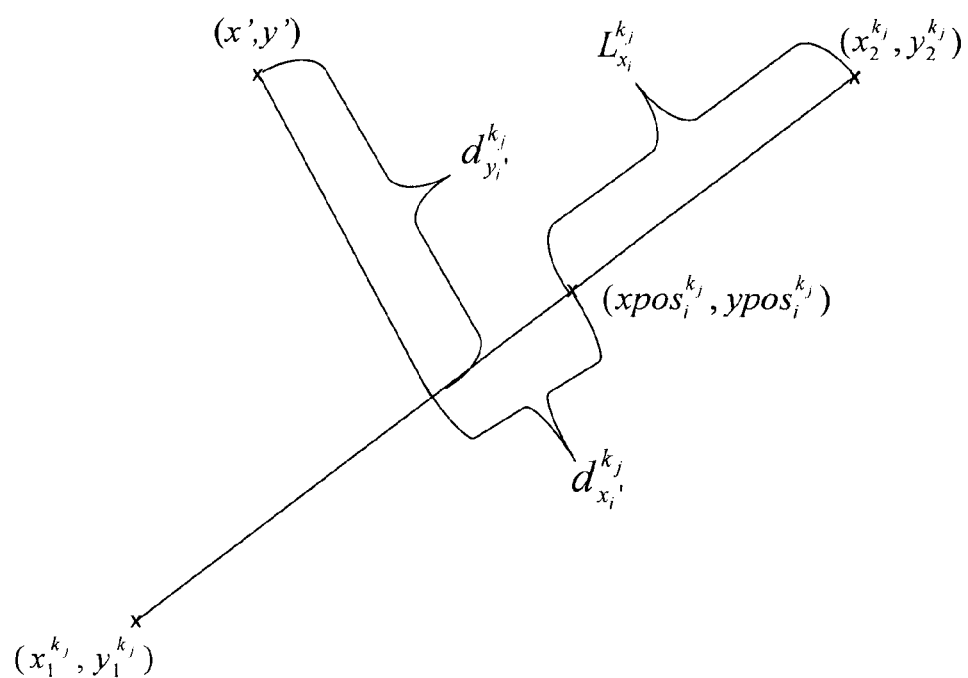
FIG. 6 shows point-line and point-point distances, $d_{y_i}^{kj}$ and $d_{x_i}^{kj}$, respectively, wherein $(xpos_i^{kj}, ypos_i^{kj})$ is the position in the global coordinate system for the exponential terms, and wherein $(x_2^{kj}, y_2^{kj})$ and $(x_1^{kj}, y_1^{kj})$ are the coordinates in the global coordinate system for line segment k of line j.

FIG. 6 shows point-line and point-point distances, $d_{y'_i}^{k_j}$ and $d_{x'_i}^{k_j}$, respectively. ($xpos_i^{k_j}$,$ypos_i^{k_j}$) is the position in the global coordinate system for the exponential terms. ($x_2^{k_j}$,$y_2^{k_j}$) and ($x_1^{k_j}$,$y_1^{k_j}$) are the coordinates in the global coordinate system for line segment k of line j.

For each line segment $k_j$ which contain at least one exponential term, positioned at ($xpos_i^{k_j}$,$ypos_i^{k_j}$), the squared distances $(d_{y'_i}^{k_j})^2$ and $(d_{x'_i}^{k_j})^2$ have to be expressed as linear combination of $(ax'+by'+c)^2$ terms otherwise it will not be possible to solve the integrals in eq. 5 analytically. This is done in the equations below.

$$\left(d_{y'_i}^{k_j}\right)^2 = \left( \frac{\left(x_2^{k_j} - x_1^{k_j}\right)\left(y_1^{k_j} - y'\right) - \left(x_1^{k_j} - x'\right)\left(y_2^{k_j} - y_1^{k_j}\right)}{\sqrt{\left(x_2^{k_j} - x_1^{k_j}\right)^2 + \left(y_2^{k_j} - y_1^{k_j}\right)^2}} \right)^2$$

-continued $$L_{x_i}^{kj} = |xpos_i^j| - \sum_{l=1}^{l=k-1} \sqrt{\left(x_2^{lj} - x_1^{lj}\right)^2 + \left(y_2^{lj} - y_1^{lj}\right)^2}$$

$$\tan\theta = \frac{y_2^{kj} - y_1^{kj}}{x_2^{kj} - x_1^{kj}}$$

$$xpos_i^{kj} = x_2^{kj} - L_{x_i}^{kj}\cos\theta$$

$$ypos_i^{kj} = y_2^{kj} - L_{x_i}^{kj}\sin\theta$$

$$\left(d_{x_i'}^{kj}\right)^2 = \left(xpos_i^{kj} - x'\right)^2 + \left(ypos_i^{kj} - y'\right)^2 - \left(d_{y_i'}^{kj}\right)^2$$

Here we have assumed that the beam is travelling from point 1 to point 2 and that line segment 1 is the last line segment of line j. Thus, line segments are summed backwards.

$|xpos_i^j|$ is the absolute value of the x-position of the exponential term i for line j from equation 4, i.e. the x-position in the beam path coordinate system of line j.

Putting all together will give us the following expression for the time dependent temperature distribution when the beam has scanned M lines:

$$T'(x, y, z, t) = T_{surf} + \sum_{j=1}^{j=M} T_{0j} + \sum_{j=1}^{j=M} \frac{H(t-t_j)}{(4\pi D(t-t_j))^{3/2}}$$

$$\int_{-\infty}^{\infty}\int_{-\infty}^{\infty}\int_{-\infty}^{0}\left(\exp\left(-\frac{(z-z')^2}{4D(t-t_j)}\right) + \exp\left(-\frac{(z+z')^2}{4D(t-t_j)}\right)\right)$$

$$\exp\left(-\frac{(y-y')^2}{4D(t-t_j)}\right)\exp\left(-\frac{(x-x')^2}{4D(t-t_j)}\right)$$

$$\sum_{kj=1}^{kj=K_j}\sum_{i=1}^{i=N_{kj}^j} A_i^j \exp\left(-\left(d_{x_i}^{kj}\right)^2/\sigma_{x_i}^j\right)\exp\left(-\left(d_{y_i}^{kj}\right)^2/\sigma_{y_i}^j\right)$$

$$\exp(-z'^2/\sigma_{z_i}^j)dz'\,dy'\,dx' - T_{0_j} =$$

$$T_{surf} + \sum_{j=1}^{j=M}\frac{H(t-t_j)}{(4\pi D(t-t_j))^{3/2}}\sum_{kj=1}^{kj=K_j}\sum_{i=1}^{i=N_{kj}^j} A_i^j I_z^{ij} I_x^{ij} I_y^{ij}$$

Where:
$K_j$ is the number of straight line segments for hatch path j.
$N_{k_j}^j$ is the number of exponential terms on each line segment $k_j$.

In subsequent sections analytical expressions for the terms within the summations will be derived. However, it should be mentioned that using the expression above for T'(x,y,z,t) it will be possible to calculate the temperature for more or less any kind of beam path and that the calculations can be effectively done in a multi CPU configuration, which means that calculation can be performed in real time.

Properties and Integration of Gaussian Functions

In order to solve the expression in eq. 6 some properties of Gaussian functions have to be known.
  1. Multiplication of two Gaussian functions is another Gaussian function:

$$\exp\left(-\frac{(ax-x_1)^2}{\sigma_1}\right)\exp\left(-\frac{(bx-x_2)^2}{\sigma_2}\right) = A\exp\left(-\frac{(x-x_3)^2}{\sigma_3}\right)$$

$$\sigma_3 = \left(\left(\frac{\sigma_1}{a^2}\right)^{-1} + \left(\frac{\sigma_2}{b^2}\right)^{-1}\right)^{-1}$$

$$x_3 = (\sigma_3\sigma_1^{-1}x_1 a + \sigma_3\sigma_2^{-1}x_2 b)$$

$$A = \exp\left(-\frac{(ax_3-x_1)^2}{\sigma_1}\right)\exp\left(-\frac{(bx_3-x_2)^2}{\sigma_2}\right)$$

2. Integrals of one Gaussian:

$$\int_{-\infty}^{\infty}\exp\left(-\frac{(a-bx)^2}{\sigma}\right)dx = \frac{\sqrt{\pi\sigma}}{b}$$

$$\int_{-\infty}^{0}\exp\left(-\frac{(a-bz)^2}{\sigma}\right)dz = \frac{\sqrt{\pi\sigma}}{2b}\operatorname{erfc}\left(\frac{a}{\sigma}\right)$$

$$\int_{-\infty}^{0}\exp\left(-\frac{(a+bz)^2}{\sigma}\right)dz = \frac{\sqrt{\pi\sigma} - \frac{\sqrt{\pi\sigma}}{2}\operatorname{erfc}\left(\frac{a}{\sigma}\right)}{b}$$

Integrals for Calculating T'(x,y,z,t)

First consider the integrals in the z direction:

$$I_z^{ij} = \int_{-\infty}^{0}\left(\exp\left(-\frac{(z-z')^2}{4D(t-t_j)}\right) + \exp\left(-\frac{(z+z')^2}{4D(t-t_j)}\right)\right)\exp(-z'^2/\sigma_{z_i}^j)dz' =$$

$$\int_{-\infty}^{0}\exp\left(-\frac{(z-z')^2}{4D(t-t_j)}\right)\exp(-z'^2/\sigma_{z_i}^j)dz' +$$

$$\int_{-\infty}^{0}\exp\left(-\frac{(z+z')^2}{4D(t-t_j)}\right)\exp(-z'^2/\sigma_{z_i}^j)dz' =$$

$$\int_{-\infty}^{\infty}A_{z_1}^{ij}\exp(-(z_{eff_1}^{ij}-z')^2/\sigma_z^{ij})dz' +$$

$$\int_{-\infty}^{0}A_{z_2}^{ij}\exp(-(z_{eff_2}^{ij}-z')^2/\sigma_z^{ij})dz' = A_z^{ij}\frac{\sqrt{\pi\sigma_z^{ij}}}{2}\operatorname{erfc}\left(\frac{z_{eff}^{ij}}{\sigma_z^{ij}}\right) +$$

$$A_z^{ij}\left(\sqrt{\pi\sigma_z^{ij}} - \frac{\sqrt{\pi\sigma_z^{ij}}}{2}\operatorname{erfc}\left(\frac{z_{eff}^{ij}}{\sigma_z^{ij}}\right)\right) = \begin{cases} \sqrt{\pi\sigma_z^{ij}}, z=0 \\ A_z^{ij}\sqrt{\pi\sigma_z^{ij}}, z\neq 0 \end{cases}$$

where:

$$\sigma_z^{ij} = \left((4D(t-t_j))^{-1} + (\sigma_{z_i}^j)^{-1}\right)^{-1}$$

$$z_{eff}^{ij} = \sigma_z^{ij}(4D(t-t_j))^{-1}z$$

$$A_z^{ij} = \exp\left(-\frac{(z_{eff}^{ij}-z)^2}{4D(t-t_j)}\right)\exp\left(-\frac{(Z_{eff}^{ij})^2}{\sigma_{z_i}^j}\right)$$

Second consider the x and y integrals:

$$I_x^{ij}I_y^{ij} = \int_{-\infty}^{\infty}\int_{-\infty}^{\infty}\exp\left(-\frac{(y-y')^2}{4D(t-t_j)}\right)\exp\left(-\frac{(x-x')^2}{4D(t-t_j)}\right)$$

$$\exp\left(-\left(d_{x_i}^{kj}\right)^2/\sigma_{x_i}^j\right)\exp\left(-\left(d_{y_i}^{kj}\right)^2/\sigma_{y_i}^j\right)dy'\,dx'$$

In the case that all line segments are parallel there is no need for differencing between x and y since the coordinate system can easily be transformed to align with the hatch lines. Thus, in the example below all lines are assumed to be parallel with the x-axis.

$$\left(y_2^{kj} - y_1^{kj}\right) = 0, \ ypos_i^{kj} = y_1^{kj}$$

$$I_x^{ij} = \int_{-\infty}^{\infty} \exp\left(-\frac{(x-x')^2}{4D(t-t_j)}\right) \exp\left(-\left(xpos_i^{kj} - x'\right)^2 / \sigma_{x_i}^j\right) dx' =$$

$$\int_{-\infty}^{\infty} A_{x_2}^{ij} \exp\left(-\left(x_{\mathit{eff}_2}^{ij} - x'\right)^2 / \sigma_{x_2}^{ij}\right) dx' = A_{x_2}^{ij} \sqrt{\pi \sigma_{x_2}^{ij}}$$

$$I_y^{ij} = \int_{-\infty}^{\infty} \exp\left(-\frac{(y-y')^2}{4D(t-t_j)}\right) \exp\left(-\left(y_1^{kj} - y'\right)^2 / \sigma_{y_i}^j\right) dy' =$$

$$\int_{-\infty}^{\infty} A_{y_2}^{ij} \exp\left(-\left(y_{\mathit{eff}_2}^{ij} - x'\right)^2 / \sigma_{y_2}^{ij}\right) dx' = A_{y_2}^{ij} \sqrt{\pi \sigma_{y_2}^{ij}}$$

where:

$$\sigma_{x_2}^{ij} = \left((4D(t-t_j))^{-1} + (\sigma_{x_i}^j)^{-1}\right)^{-1}$$

$$x_{\mathit{eff}_2}^{ij} = \sigma_{x_2}^{ij}(4D(t-t_j))^{-1}x + \sigma_{x_2}^{ij}(\sigma_{x_i}^j)^{-1} xpos_i^{kj}$$

$$A_{x_2}^{ij} = \exp\left(-\frac{\left(x_{\mathit{eff}_2}^{ij} - x\right)^2}{4D(t-t_j)}\right) \exp\left(-\frac{\left(x_{\mathit{eff}_2}^{ij} - xpos_i^{kj}\right)^2}{\sigma_{x_i}^j}\right)$$

$$\sigma_{y_2}^{ij} = \left((4D(t-t_j))^{-1} + (\sigma_{y_i}^j)^{-1}\right)^{-1}$$

$$y_{\mathit{eff}_2}^{ij} = \sigma_{y_2}^{ij}(4D(t-t_j))^{-1}y + \sigma_{y_2}^{ij}(\sigma_{y_i}^j)^{-1} y_1^{kj}$$

$$A_{y_2}^{ij} = \exp\left(-\frac{\left(y_{\mathit{eff}_2}^{ij} - y\right)^2}{4D(t-t_j)}\right) \exp\left(-\frac{\left(y_{\mathit{eff}_2}^{ij} - y_1^{kj}\right)^2}{\sigma_{y_i}^j}\right)$$

If the line segments are not parallel and have an arbitrary direction the algebra becomes a bit more involved. In such case first consider the x-integration:

$$I_x^{ij} = \int_{-\infty}^{\infty} \exp\left(-\frac{(x-x')^2}{4D(t-t_j)}\right) \exp\left(-\left(xpos_i^{kj} - x'\right)^2 / \sigma_{x_i}^j\right)$$

$$\exp\left(-\left(\frac{\left(x_2^{kj} - x_1^{kj}\right)\left(y_1^{kj} - y'\right) - \left(x_1^{kj} - x'\right)\left(y_2^{kj} - y_1^{kj}\right)}{\sqrt{\left(x_2^{kj} - x_1^{kj}\right)^2 + \left(y_2^{kj} - y_1^{kj}\right)^2}}\right)^2 \times \left(\frac{1}{\sigma_{y_i}^j} - \frac{1}{\sigma_{x_i}^j}\right)\right) dx' =$$

$$\int_{-\infty}^{\infty} A_{x_1}^{ij} \exp\left(-\left(x_{\mathit{eff}_1}^{ij} - x'\right)^2 / \sigma_{x_1}^{ij}\right)$$

$$\exp\left(-\left(\frac{\left(x_2^{kj} - x_1^{kj}\right)\left(y_1^{kj} - y'\right) - \left(x_1^{kj} - x'\right)\left(y_2^{kj} - y_1^{kj}\right)}{\sqrt{\left(x_2^{kj} - x_1^{kj}\right)^2 + \left(y_2^{kj} - y_1^{kj}\right)^2}}\right)^2 \times \left(\frac{1}{\sigma_{y_i}^j} - \frac{1}{\sigma_{x_i}^j}\right)\right) dx' =$$

$$\int_{-\infty}^{\infty} A_{x_1}^{ij} \exp\left(-\left(x_{\mathit{eff}_1}^{ij} - x'\right)^2 / \sigma_{x_1}^{ij}\right)$$

-continued $$\exp\left(-\left(\frac{\left(x_2^{kj} - x_1^{kj}\right)\left(y_1^{kj} - y'\right) - x_1^{kj}\left(y_2^{kj} - y_1^{kj}\right)}{\left(y_1^{kj} - y_2^{kj}\right)} - x'\right)^2 \middle/ \right.$$

$$\left.\left(\frac{\left(y_1^{kj} - y_2^{kj}\right)^2}{\left(x_2^{kj} - x_1^{kj}\right)^2 + \left(y_2^{kj} - y_1^{kj}\right)^2}\left(\frac{1}{\sigma_{y_i}^j} - \frac{1}{\sigma_{x_i}^j}\right)\right)^{-1}\right) dx' =$$

$$A_{x_1}^{ij} \int_{-\infty}^{\infty} A_{x_2}^{ij} \exp\left(-\left(x_{\mathit{eff}_2}^{ij} - x'\right)^2 / \sigma_{x_2}^{ij}\right) dx' = A_{x_1}^{ij} A_{x_2}^{ij} \sqrt{\pi \sigma_{x_2}^{ij}}$$

where:

$$\sigma_{x_1}^{ij} = \left((4D(t-t_j))^{-1} + (\sigma_{x_i}^j)^{-1}\right)^{-1}$$

$$x_{\mathit{eff}_1}^{ij} = \sigma_{x_1}^{ij}(4D(t-t_j))^{-1}x + \sigma_{x_1}^{ij}(\sigma_{x_i}^j)^{-1} xpos_i^{kj}$$

$$A_{x_1}^{ij} = \exp\left(-\frac{\left(x_{\mathit{eff}_1}^{ij} - x\right)^2}{4D(t-t_j)}\right) \exp\left(-\frac{\left(x_{\mathit{eff}_1}^{ij} - xpos_i^{kj}\right)^2}{\sigma_{x_i}^j}\right)$$

$$\sigma_{x_2}^{ij} = \left((\sigma_{x_1}^{ij})^{-1} + \frac{\left(y_1^{kj} - y_2^{kj}\right)^2}{\left(x_2^{kj} - x_1^{kj}\right)^2 + \left(y_2^{kj} - y_1^{kj}\right)^2}\left(\frac{1}{\sigma_{y_i}^j} - \frac{1}{\sigma_{x_i}^j}\right)\right)^{-1} =$$

$$\left((\sigma_{x_1}^{ij})^{-1} + (\sigma_{xy}^{ij})^{-1}\right)^{-1}$$

$$\sigma_{xy}^{ij} = \left(\frac{\left(y_1^{kj} - y_2^{kj}\right)^2}{\left(x_2^{kj} - x_1^{kj}\right)^2 + \left(y_2^{kj} - y_1^{kj}\right)^2}\left(\frac{1}{\sigma_{y_i}^j} - \frac{1}{\sigma_{x_i}^j}\right)\right)^{-1}$$

$$x_{\mathit{eff}_2}^{ij} = \sigma_{x_2}^{ij}(\sigma_{x_1}^{ij})^{-1} x_{\mathit{eff}_1}^{ij} + \sigma_{x_2}^{ij}(\sigma_{xy}^{ij})^{-1} \frac{\left(x_2^{kj} - x_1^{kj}\right)\left(y_1^{kj} - y'\right) - x_1^{kj}\left(y_2^{kj} - y_1^{kj}\right)}{\left(y_1^{kj} - y_2^{kj}\right)} =$$

$$a - y'c$$

$$a = \sigma_{x_2}^{ij}(\sigma_{x_1}^{ij})^{-1} x_{\mathit{eff}_1}^{ij} + \sigma_{x_2}^{ij}(\sigma_{xy}^{ij})^{-1} \frac{\left(x_2^{kj} - x_1^{kj}\right)y_1^{kj} - x_1^{kj}\left(y_2^{kj} - y_1^{kj}\right)}{\left(y_1^{kj} - y_2^{kj}\right)} =$$

$$\sigma_{x_2}^{ij}(\sigma_{x_1}^{ij})^{-1} x_{\mathit{eff}_1}^{ij} + \sigma_{x_2}^{ij}(\sigma_{xy}^{ij})^{-1} b$$

$$b = \frac{\left(x_2^{kj} - x_1^{kj}\right)y_1^{kj} - x_1^{kj}\left(y_2^{kj} - y_1^{kj}\right)}{\left(y_1^{kj} - y_2^{kj}\right)}$$

$$c = \sigma_{x_2}^{ij}(\sigma_{xy}^{ij})^{-1}\left(x_1^{kj} - x_2^{kj}\right) / \left(y_1^{kj} - y_2^{kj}\right) = \sigma_{x_2}^{ij}(\sigma_{xy}^{ij})^{-1} d$$

$$d = \left(x_1^{kj} - x_2^{kj}\right) / \left(y_1^{kj} - y_2^{kj}\right)$$

$$A_{x_2}^{ij} = \exp\left(-\frac{\left(x_{\mathit{eff}_2}^{ij} - x_{\mathit{eff}_1}^{ij}\right)^2}{\sigma_{x_1}^{ij}}\right) \exp\left(-\frac{\left(x_{\mathit{eff}_2}^{ij} - \frac{\left(x_2^{kj} - x_1^{kj}\right)\left(y_1^{kj} - y'\right) - x_1^{kj}\left(y_2^{kj} - y_1^{kj}\right)}{\left(y_1^{kj} - y_2^{kj}\right)}\right)^2}{\sigma_{xy}^{ij}}\right) =$$

$$\exp\left(-\frac{\left(a - x_{\mathit{eff}_1}^{ij} - y'c\right)}{\sigma_{x_1}^{ij}}\right)$$

$$\exp\left(-\frac{(a - b - y'(c + d))^2}{\sigma_{xy}^{ij}}\right) =$$

$$A^{ij} \exp\left(-(e - y')^2 / \sigma_y\right)$$

-continued $$\sigma_y = \left(\left(\frac{\sigma_{x_1}^{ij}}{c^2}\right)^{-1} + \left(\frac{\sigma_{xy}^{ij}}{(c+d)^2}\right)^{-1}\right)^{-1}$$

$$e = \sigma_y(\sigma_{x_1}^{ij})^{-1}(a - x_{eff_1}^{ij})c + \sigma_y(\sigma_{xy}^{ij})^{-1}(a-b)(c+d)$$

$$A^{ij} = \exp\left(-\frac{(ce - a + x_{eff_1}^{ij})^2}{\sigma_{x_1}^{ij}}\right)\exp\left(-\frac{((c+d)e - a + b)^2}{\sigma_{xy}^{ij}}\right)$$

Thus: $I_x^{ij} = A_{x_1}^{ij} A_{x_2}^{ij} \sqrt{\pi \sigma_{x_2}^{ij}} = A_{x_1}^{ij} \sqrt{\pi \sigma_{x_2}^{ij}} A^{ij} \exp\left(-\frac{(e - y')^2}{\sigma_y}\right)$ Now consider the y integration:

$$I_y^{ij} = \int_{-\infty}^{\infty} \exp\left(-\frac{(y - y')^2}{4D(t - t_j)}\right)$$

$$\exp\left(-\left(ypos_i^{kj} - y'\right)^2 / \sigma_{x_i}^j\right) \exp(-(e - y')^2 / \sigma_y) dy' =$$

$$\int_{-\infty}^{\infty} A_{y_1}^{ij} \exp\left(-\frac{(y_{eff_1}^{ij} - y')^2}{\sigma_{y_1}^{ij}}\right) \exp(-(e-y')^2/\sigma_y) dy' =$$

$$\int_{-\infty}^{\infty} A_{y_1}^{ij} A_{y_2}^{ij} \exp\left(-\frac{(y_{eff_2}^{ij} - y')^2}{\sigma_{y_2}^{ij}}\right) dy = A_{y_1}^{ij} A_{y_2}^{ij} \sqrt{\pi \sigma_{y_2}^{ij}}$$

where:

$$\sigma_{y_1}^{ij} = ((4D(t-t_j))^1 + (\sigma_{x_i}^j)^{-1})^{-1}$$

$$y_{eff_1}^{ij} = \sigma_{y_1}^{ij}(4D(t-t_j))^{-1} y + \sigma_{y_1}^{ij}(\sigma_{x_i}^j)^{-1} ypos_i^{kj}$$

$$A_{y_1}^{ij} = \exp\left(-\frac{(y_{eff_1}^{ij} - y)^2}{4D(t-t_j)}\right)\exp\left(-\frac{(y_{eff_1}^{ij} - ypos_i^{kj})^2}{\sigma_{x_i}^j}\right)$$

$$\sigma_{y_2}^{ij} = ((\sigma_{y_1}^{ij})^{-1} + (\sigma_y)^{-1})^{-1}$$

$$y_{eff_2}^{ij} = \sigma_{y_2}^{ij}(\sigma_{y_1}^{ij})^{-1} y_{eff_1}^{ij} + \sigma_{y_2}^{ij}(\sigma_y)^{-1} e$$

$$A_{y_2}^{ij} = \exp\left(-\frac{(y_{eff_2}^{ij} - y_{eff_1}^{ij})^2}{\sigma_{y_1}^{ij}}\right)\exp\left(-\frac{(y_{eff_2}^{ij} - e)^2}{\sigma_y}\right)$$

Summary of the Total Expression $$T''(x,y,z,t) = T_{surf} + \sum_{j=1}^{j=M} \frac{1}{(4\pi D(t-t_j))^{3/2}} \sum_{k_j=1}^{k_j=K_j} \sum_{i=1}^{i=N_k^j} A_i^j I_z^{ij} I_x^{ij} I_y^{ij}$$

Positions of the exponential terms:

$$L_{x_i}^{kj} = |xpos_i^j| - \sum_{l=1}^{l=k-1} \sqrt{(x_2^{l_j} - x_1^{l_j})^2 + (y_2^{l_j} - y_1^{l_j})^2}$$

$$\tan\theta = \frac{y_2^{kj} - y_1^{kj}}{x_2^{kj} - x_1^{kj}}$$

$$xpos_i^{kj} = y_2^{kj} - L_{x_i}^{kj} \cos\theta$$

$$ypos_i^{kj} = y_2^{kj} - L_{x_i}^{kj} \sin\theta$$

-continued $$I_z^{ij} = \begin{cases} \sqrt{\pi \sigma_z^{ij}}, & z = 0 \\ A_z^{ij} \sqrt{\pi \sigma_z^{ij}}, & z \neq 0 \end{cases}$$

where:

$$\sigma_z^{ij} = ((4D(t-t_j))^{-1} + (\sigma_{z_i}^j)^{-1})^{-1}$$

$$z_{eff}^{ij} = \sigma_z^{ij}(4D(t-t_j))^{-1} z$$

$$A_z^{ij} = \exp\left(-\frac{(z_{eff}^{ij} - z)^2}{4D(t-t_j)}\right)\exp\left(-\frac{(Z_{eff}^{ij})^2}{\sigma_{z_i}^j}\right)$$

Parallel Lines:

$$(y_2^{kj} - y_1^{kj}) = 0, \; ypos_i^{kj} = y_1^{kj}$$

$$I_x^{ij} = A_{x_2}^{ij} \sqrt{\pi \sigma_{x_2}^{ij}}$$

$$I_y^{ij} = A_{y_2}^{ij} \sqrt{\pi \sigma_{y_2}^{ij}}$$

where:

$$\sigma_{x_2}^{ij} = ((4D(t-t_j))^{-1} + (\sigma_{x_i}^j)^{-1})^{-1}$$

$$x_{eff_2}^{ij} = \sigma_{x_2}^{ij}(4D(t-t_j))^{-1} x + \sigma_{x_2}^{ij}(\sigma_{x_i}^j)^{-1} xpos_i^{kj}$$

$$A_{x_2}^{ij} = \exp\left(-\frac{(x_{eff_2}^{ij} - x)^2}{4D(t-t_j)}\right)\exp\left(-\frac{(x_{eff_2}^{ij} - xpos_i^{kj})^2}{\sigma_{x_i}^j}\right)$$

$$\sigma_{y_2}^{ij} = ((4D(t-t_j))^{-1} + (\sigma_{y_i}^j)^{-1})^{-1}$$

$$y_{eff_2}^{ij} = \sigma_{y_2}^{ij}(4D(t-t_j))^{-1} y + \sigma_{y_2}^{ij}(\sigma_{y_i}^j)^{-1} y_1^{kj}$$

$$A_{y_2}^{ij} = \exp\left(-\frac{(y_{eff_2}^{ij} - y)^2}{4D(t-t_j)}\right)\exp\left(-\frac{(y_{eff_2}^{ij} - y_1^{kj})^2}{\sigma_{y_i}^j}\right)$$

Arbitrary Direction of the Hatch Lines:

$$(x_2^{kj} - x_1^{kj}) \neq 0, \; (y_2^{kj} - y_1^{kj}) \neq 0$$

$$I_x^{ij} I_y^{ij} = A_{x_1}^{ij} \sqrt{\pi \sigma_{x_2}^{ij}} A^{ij} A_{y_1}^{ij} A_{y_2}^{ij} \sqrt{\pi \sigma_{y_2}^{ij}}$$

where:

$$\sigma_{x_1}^{ij} = ((4D(t-t_j))^1 + (\sigma_{x_i}^j)^{-1})^{-1}$$

$$x_{eff_1}^{ij} = \sigma_{x_1}^{ij}(4D(t-t_j))^{-1} x + \sigma_{x_1}^{ij}(\sigma_{x_i}^j)^{-1} xpos_i^{kj}$$

$$A_{x_1}^{ij} = \exp\left(-\frac{(x_{eff_1}^{ij} - x)^2}{4D(t-t_j)}\right)\exp\left(-\frac{(x_{eff_1}^{ij} - xpos_i^{kj})^2}{\sigma_{x_i}^j}\right)$$

$$\sigma_{x_2}^{ij} = \left((\sigma_{x_1}^{ij})^{-1} + \frac{(y_1^{kj} - y_2^{kj})^2}{(x_2^{kj} - x_1^{kj})^2 + (y_2^{kj} - y_1^{kj})^2}\left(\frac{1}{\sigma_{y_i}^j} - \frac{1}{\sigma_{x_i}^j}\right)\right)^{-1} =$$

$$((\sigma_{x_1}^{ij})^{-1} + (\sigma_{xy}^{ij})^{-1})^{-1}$$

$$\sigma_{xy}^{ij} = \left(\frac{(y_1^{kj} - y_2^{kj})^2}{(x_2^{kj} - x_1^{kj})^2 + (y_2^{kj} - y_1^{kj})^2}\left(\frac{1}{\sigma_{y_i}^j} - \frac{1}{\sigma_{x_i}^j}\right)\right)^{-1}$$

$$x_{eff_2}^{ij} = \sigma_{x_2}^{ij}(\sigma_{x_1}^{ij})^{-1} x_{eff_1}^{ij} +$$

-continued $$\sigma_{x_2}^{ij}(\sigma_{xy}^{ij})^{-1}\frac{\left(x_2^{kj}-x_1^{kj}\right)\left(y_1^{kj}-y'\right)-x_1^{kj}\left(y_2^{kj}-y_1^{kj}\right)}{\left(y_1^{kj}-y_2^{kj}\right)}=a-y'c$$

$$a=\sigma_{x_2}^{ij}(\sigma_{x_1}^{ij})^{-1}x_{\it{eff}1}^{ij}+\sigma_{x_2}^{ij}(\sigma_{xy}^{ij})^{-1}\frac{\left(x_2^{kj}-x_1^{kj}\right)y_1^{kj}-x_1^{kj}\left(y_2^{kj}-y_1^{kj}\right)}{\left(y_1^{kj}-y_2^{kj}\right)}=$$

$$\sigma_{x_2}^{ij}(\sigma_{x_1}^{ij})^{-1}x_{\it{eff}1}^{ij}+\sigma_{x_2}^{ij}(\sigma_{xy}^{ij})^{-1}b$$

$$b=\frac{\left(x_2^{kj}-x_1^{kj}\right)y_1^{kj}-x_1^{kj}\left(y_2^{kj}-y_1^{kj}\right)}{\left(y_1^{kj}-y_2^{kj}\right)}$$

$$c=\sigma_{x_2}^{ij}(\sigma_{xy}^{ij})^{-1}\left(x_1^{kj}-x_2^{kj}\right)/\left(y_1^{kj}-y_2^{kj}\right)=\sigma_{x_2}^{ij}(\sigma_{xy}^{ij})^{-1}d$$

$$d=\left(x_1^{kj}-x_2^{kj}\right)/\left(y_1^{kj}-y_2^{kj}\right)$$

$$A_{x_2}^{ij}=\exp\left(-\frac{(x_{\it{eff}2}^{ij}-x_{\it{eff}1}^{ij})^2}{\sigma_{x_1}^{ij}}\right)$$

$$\exp\left(-\frac{\left(x_{\it{eff}2}^{ij}-\frac{\left(x_2^{kj}-x_1^{kj}\right)\left(y_1^{kj}-y'\right)-x_1^{kj}\left(y_2^{kj}-y_1^{kj}\right)}{\left(y_1^{kj}-y_2^{kj}\right)}\right)^2}{\sigma_{xy}^{ij}}\right)=$$

$$\exp\left(-\frac{(a-x_{\it{eff}1}^{ij}-y'c)^2}{\sigma_{x_1}^{ij}}\right)\exp\left(-\frac{(a-b-y'(c+d))^2}{\sigma_{xy}^{ij}}\right)=$$

$$A^{ij}\exp-(e-y')^2/\sigma_y$$

$$\sigma_y=\left(\left(\frac{\sigma_{x_1}^{ij}}{c^2}\right)^{-1}+\left(\frac{\sigma_{xy}^{ij}}{(c+d)^2}\right)^{-1}\right)^{-1}$$

$$e=\sigma_y(\sigma_{x_1}^{ij})^{-1}\left(a-x_{\it{eff}1}^{ij}\right)c+\sigma_y(\sigma_{xy}^{ij})^{-1}(a-b)(c+d)$$

$$A^{ij}=\exp\left(-\frac{(ce-a+x_{\it{eff}1}^{ij})^2}{\sigma_{x_1}^{ij}}\right)\exp\left(-\frac{((c+d)e-a+b)^2}{\sigma_{xy}^{ij}}\right)$$

$$\sigma_{y_1}^{ij}=((4D(t-t_j))^1+(\sigma_{x_i}^{j})^{-1})^{-1}$$

$$y_{\it{eff}1}^{ij}=\sigma_{y_1}^{ij}(4D(t-t_j))^{-1}y+\sigma_{y_1}^{ij}(\sigma_{x_i}^{j})^{-1}ypos_i^{kj}$$

$$A_{y_1}^{ij}=\exp\left(-\frac{(y_{\it{eff}1}^{ij}-y)^2}{4D(t-t_j)}\right)\exp\left(-\frac{(y_{\it{eff}1}^{ij}-ypos_i^{kj})^2}{\sigma_{x_i}^{j}}\right)$$

$$\sigma_{y_2}^{ij}=((\sigma_{y_1}^{ij})^{-1}+(\sigma_y)^{-1})^{-1}$$

$$y_{\it{eff}2}^{ij}=\sigma_{y_2}^{ij}(\sigma_{y_1}^{ij})^{-1}y_{\it{eff}1}^{ij}+\sigma_{y_2}^{ij}(\sigma_y)^{-1}e$$

$$A_{y_2}^{ij}=\exp\left(-\frac{(y_{\it{eff}2}^{ij}-y_{\it{eff}1}^{ij})^2}{\sigma_{y_1}^{ij}}\right)\exp\left(-\frac{(y_{\it{eff}2}^{ij}-e)^2}{\sigma_y}\right)$$

Calculation of Beam Parameters Along the Hatch Line

As the (imaginary) beam scans along the hatch paths the temperature around the spot can now be calculated from the expression in eq. 6 and by inserting pre calculated Gaussian functions for the temperature profiles for the previous hatch lines.

By knowing the temperature and by having access to optimized data for the beam parameters for different conditions it will be possible to adjust the beam energy input (i.e. the specific energy deposition) in an appropriate way.

EXAMPLE

In the following hatch example (cf. FIG. 7) a trapezoid will be melted with a constant beam power and it will be the beam speed that is varied in order to have constant melt depth and melt width. The intended beam path is such that the beam starts to scan the lines in FIG. 7 from the bottom to the top by altering the direction from left to right to right to left.

The spot size has been optimized for Tsurf, the temperature in the part prior to fusing, such that the maximum temperature in the melt pool is limited to Tmax. This means that the first hatch line is scanned with a constant speed and a fixed spot size. All the other lines are scanned with the same spot size and power but with different and varying speeds. The speed in each point of calculation distributed along the intended beam path is obtained by first calculating the temperature distribution around the point and then from speed versus temperature data in the data base. The speed in the data base has been optimized for the specific beam settings (power and spot size) and temperature such that the melt depth and the melt width are the same for all lines. At the end of each hatch line the temperature profile created by the imaginary beam is modeled by Gaussian functions taken from the data base. The range of the temperature of the data base was from Tsurf to Tmelt and the temperature step for the pre calculated data was set to 20 K. A lookup table procedure was used to pick the nearest speed and Gaussian functions for the calculated temperature.

Figure 8:
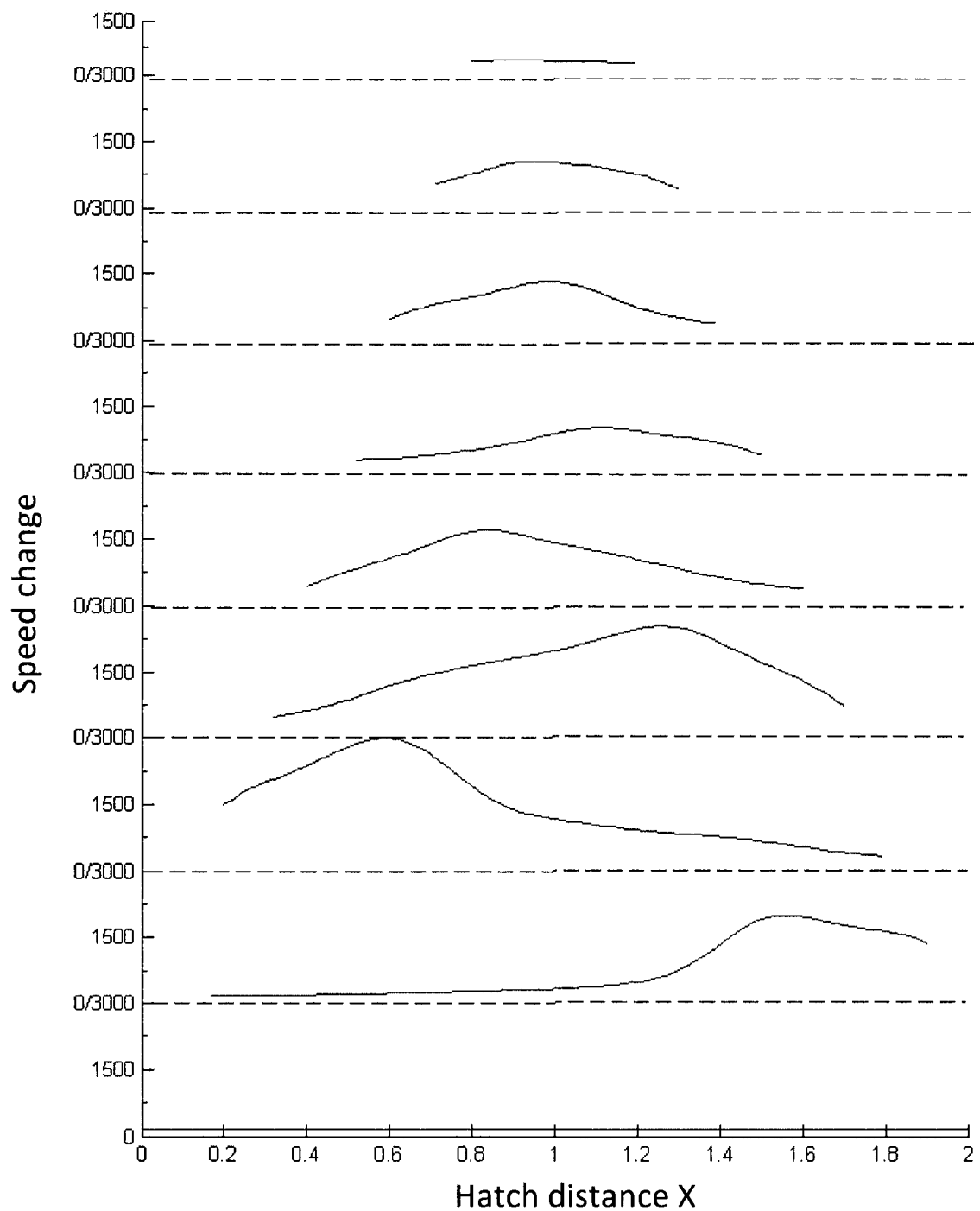
FIG. 8 shows a determined operating scheme for the specific energy deposition of the beam to be used for the intended beam path shown in FIG. 7, wherein the specific energy deposition in this example is varied by varying the beam speed.

The resulting speed profiles along each hatch line are depicted in FIG. 8. These profiles are based on the calculations of the local temperature distributions along the intended beam path and correspond to the determined operating scheme for the specific energy deposition of the beam to be used for the intended beam path when fusing together the selected area of the at least one layer, wherein the specific energy deposition in this example is varied by varying the beam speed.

In the example above a step wise procedure was used to obtain the temperature and the speed along the lines. This means that, firstly, the temperature at a specific point along the line was calculated using equation 6 for parallel lines. Secondly, the speed was obtained from the temperature by using the data base as a lookup table. The next point along the hatch line could be calculated with a fixed distance, Δr, where the time step would be equal to Δr/Speed. However, since the gradients of the temperature vary rather dramatically with respect to the time and space coordinates a fixed distance procedure was not efficient enough. In some places a small step would be needed whereas in other places a rather long step could be accurate enough. Instead a maximum allowed change in speed was used. From this the maximum allowed difference in temperature could be obtained and by numerically calculating the derivates of the temperature with respect to both time and space the maximum allowed spatial step could be obtained.

The derived algorithm was very efficient, and there were no problems for including up to thousands of hatch lines in a real time calculation. The term real time calculation refer to a calculation in which the time for calculating the speed along the hatch lines will be less than the actual melting time.

The invention is not limited by the embodiments described above but can be modified in various ways within the scope of the claims. For instance, it is possible to use a more detailed and complex description of the melt process when optimizing the beam parameters and creating the data base; powder can be modeled as an inhomogeneous material together with melt enthalpies and a detailed model of the melting-freezing process.

The calculations according to equation 6 can be used for optimizing the hatch strategy with respect to, for instance, a minimum melt/fusing time. For such an optimization there is no need for doing all the calculations in real time as long as they are made possible from a practical point of view. However, it might be beneficial if the calculation for each possible hatch strategy could be done in real time. Thus, there will be no need for saving all the data obtained from the optimization step. Instead information to be saved during the optimization step could be limited to for instance hatch angles, distances between hatch lines, position of the hatch with respect to the part etc.

The method describe can be combined with e.g. a method used for calculating the beam power needed for maintaining the parts to be built at a specific temperature as described in WO 2004/056511. Thus, the overall energy input can be calculated from an energy equilibrium calculation including the geometry of the part, whereas the method described here is used for controlling the local energy or power deposition provided by the beam during fusing.

The method described uses a homogenous material model to obtain the local temperature (distributions) along the hatch lines. However, local differences in material properties could be modeled by using different D values on different locations. For instance sections which are very thin could be modeled by having a lower thermal conductivity. There is no limitation in the method for expanding the data base with optimized data for even for such sections. In a similar way it is possible to take into account that lower layers in the powder bed are located closer to the adjustable work table which is likely to have thermal properties that differ from that of the powder bed.

It is possible to establish the intended beam path for only a part of the selected area before calculating and determining the operation scheme for that part of the selected area. Further, it is possible to calculate and determine the operation scheme for only a part of a fully established intended beam path. The step of fusing together the selected area of the at least one layer may be initiated while the steps of establishing an intended beam path, calculating the temperature etc. regarding a still non-fused portion of the selected area are on-going. Further, the at least one powder layer may comprise more than one selected area; these selected (part) areas may have different forms and can be handled separately.

As explained above, in the calculations of the temperature along the intended beam path the energy deposited by the (imaginary) beam along the path up to a certain point of time is taken into consideration when the temperature calculation for the same point of time is carried out. This way the temperature build-up is properly taken into account.

In the example described above the temperature calculations are carried out in a number of positions distributed along the intended beam path and in each of these positions a local temperature distribution is calculated. Further, the local temperature distribution is calculated in a position one step ahead of the position of the imaginary beam. The specific energy deposition to be used when moving the beam this single step to the next position somewhat ahead is obtained from a database containing a number of pre-calculated specific energy depositions (i.e. beam speeds in the described example) for different local temperature distributions (for the powdery material used and for certain fusing conditions), wherein the calculated local temperature distribution in the next position is used to select the proper value or values from the data base.

The invention claimed is:

1. Method for production of a three-dimensional body by successively providing powder layers and fusing together of selected areas of said layers, which areas correspond to successive cross sections of the three-dimensional body, said method comprising the following steps for at least one of said layers:
   applying the at least one powder layer onto a working area;
   fusing together a selected area of the at least one powder layer by supplying energy from a radiation gun to the selected area;
   establishing an intended beam path that is to be used when fusing together the selected area of the at least one powder layer;
   calculating a temperature in the at least one powder layer along the intended beam path as a function of a specific energy deposition of an imaginary beam that is assumed to move along the intended beam path;
   adjusting the specific energy deposition of the imaginary beam along the intended beam path depending on the calculated temperature and on conditions set for the step of fusing together the selected area; and
   providing, based on the calculations and the adjustments, an operating scheme for the specific energy deposition of the real beam to be used for the intended beam path when fusing together the selected area of the at least one layer.

2. Method according to claim 1, further comprising the step of using the operating scheme for the specific energy deposition when fusing together the selected area of the at least one powder layer.

3. Method according to claim 1, wherein the specific energy deposition is the energy deposited by the beam per time unit and area unit divided by the beam speed, and the specific energy deposition is varied by varying at least one of a beam speed, a beam power, or a beam spot size.

4. Method according to claim 1, wherein the method comprises the use of a set of predetermined data related to the material to be fused, and wherein said data set comprises values of the specific energy deposition to be selected as a function of temperature calculated and conditions set.

5. Method according to claim 1, wherein the conditions set for the fusing step include at least one of the following conditions for the at least one powder layer: maximum temperature, working temperature, melt depth, or melt width.

6. Method according to claim 1, wherein the step of calculating the temperature includes the step of solving a time dependent heat equation.

7. Method according to claim 1, wherein the step of calculating the temperature includes calculating a local temperature distribution along the intended beam path.

8. Method according to claim 1, wherein the step of calculating the temperature includes several calculations carried out in a number of points distributed along the intended beam path.

9. Method according to claim 8, wherein a maximum distance between adjacent points of calculation is set by setting a limiting value for the allowed change of the specific energy deposition between the adjacent points.

10. Method according to claim 1, wherein the step of establishing the intended beam path includes the steps of:
    making calculations of the temperature along a plurality of possible beam paths; and
    selecting the intended beam path out of said plurality of beam paths.

* * * * *